Fig. 10.

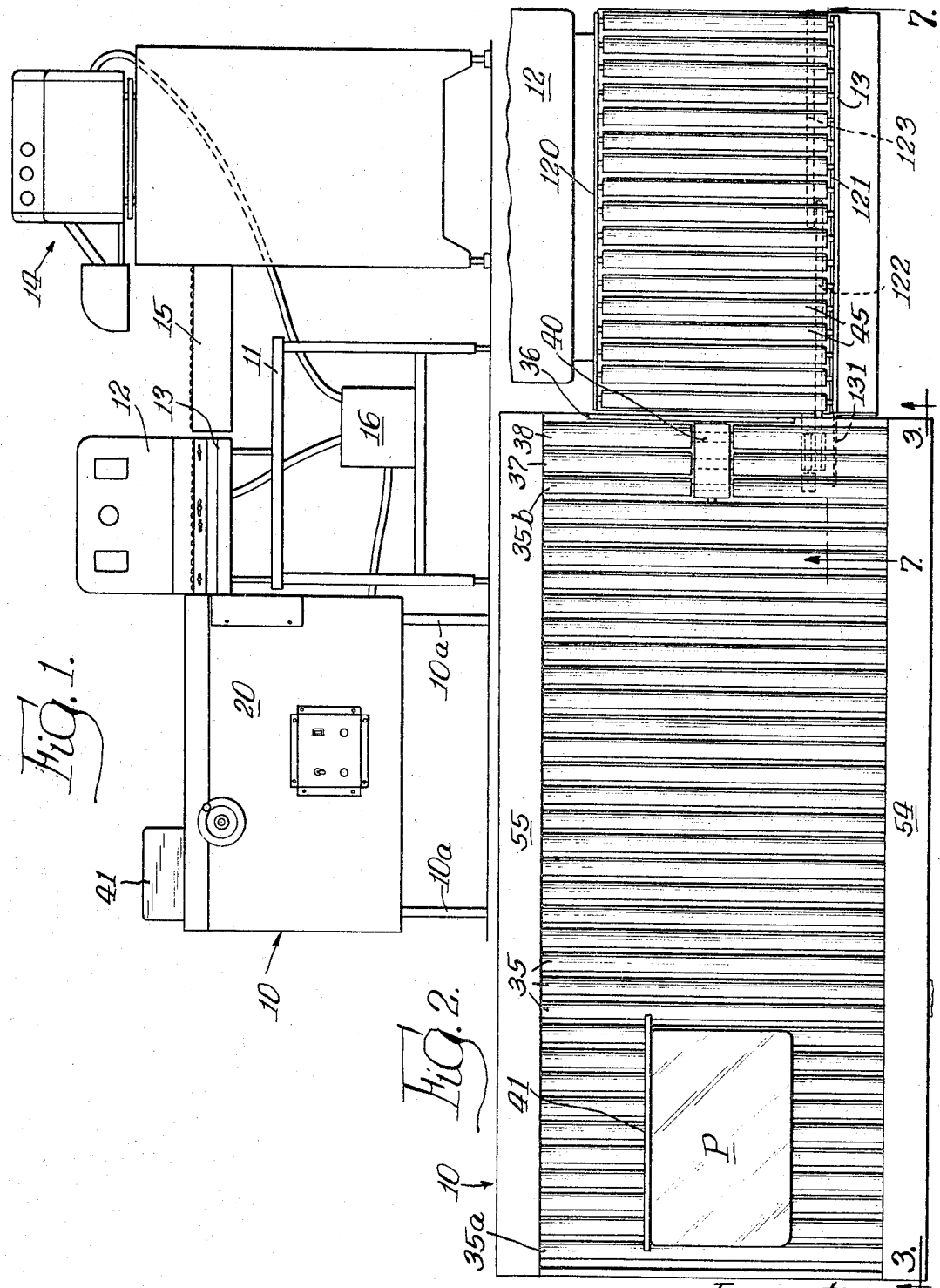

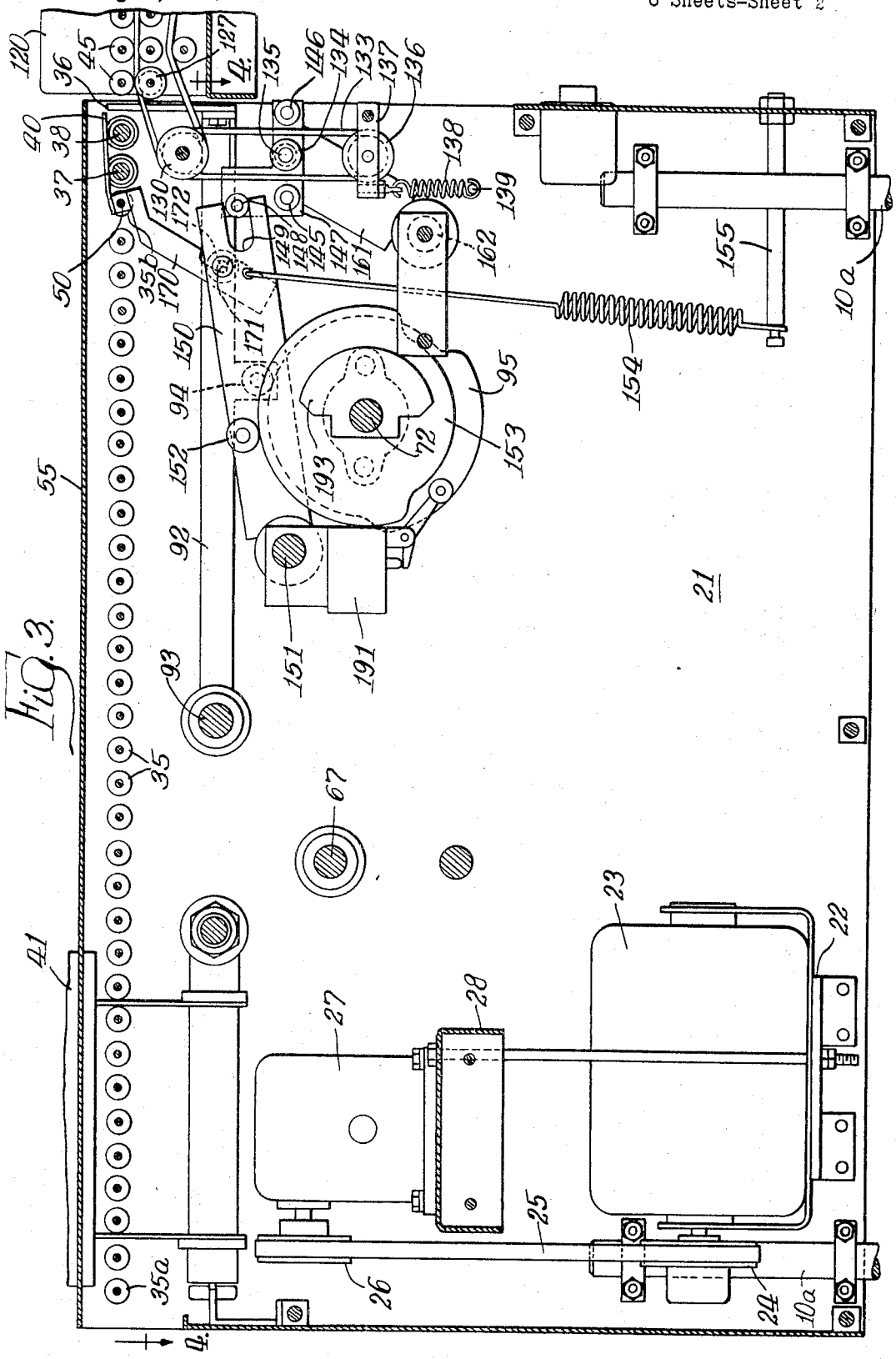

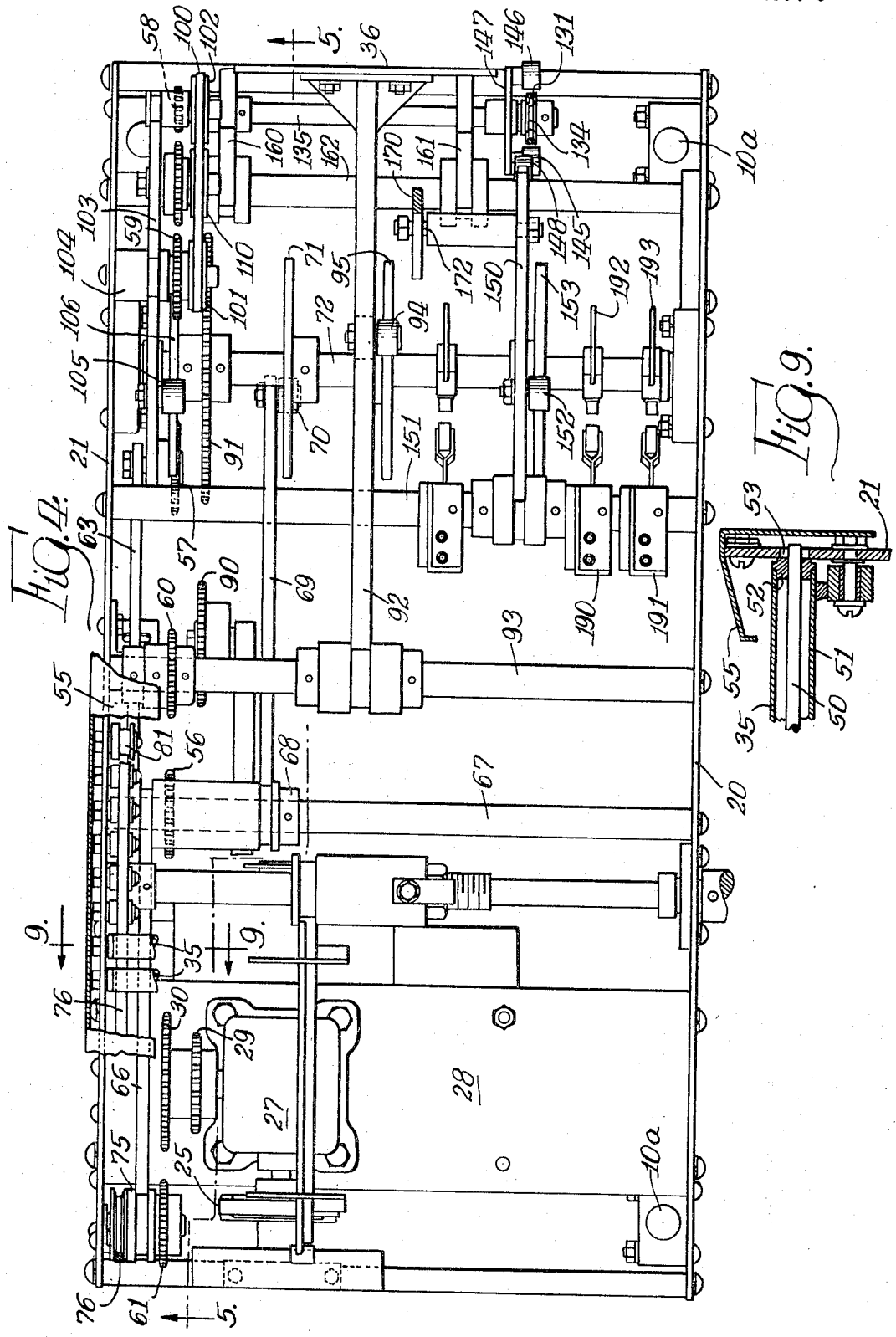

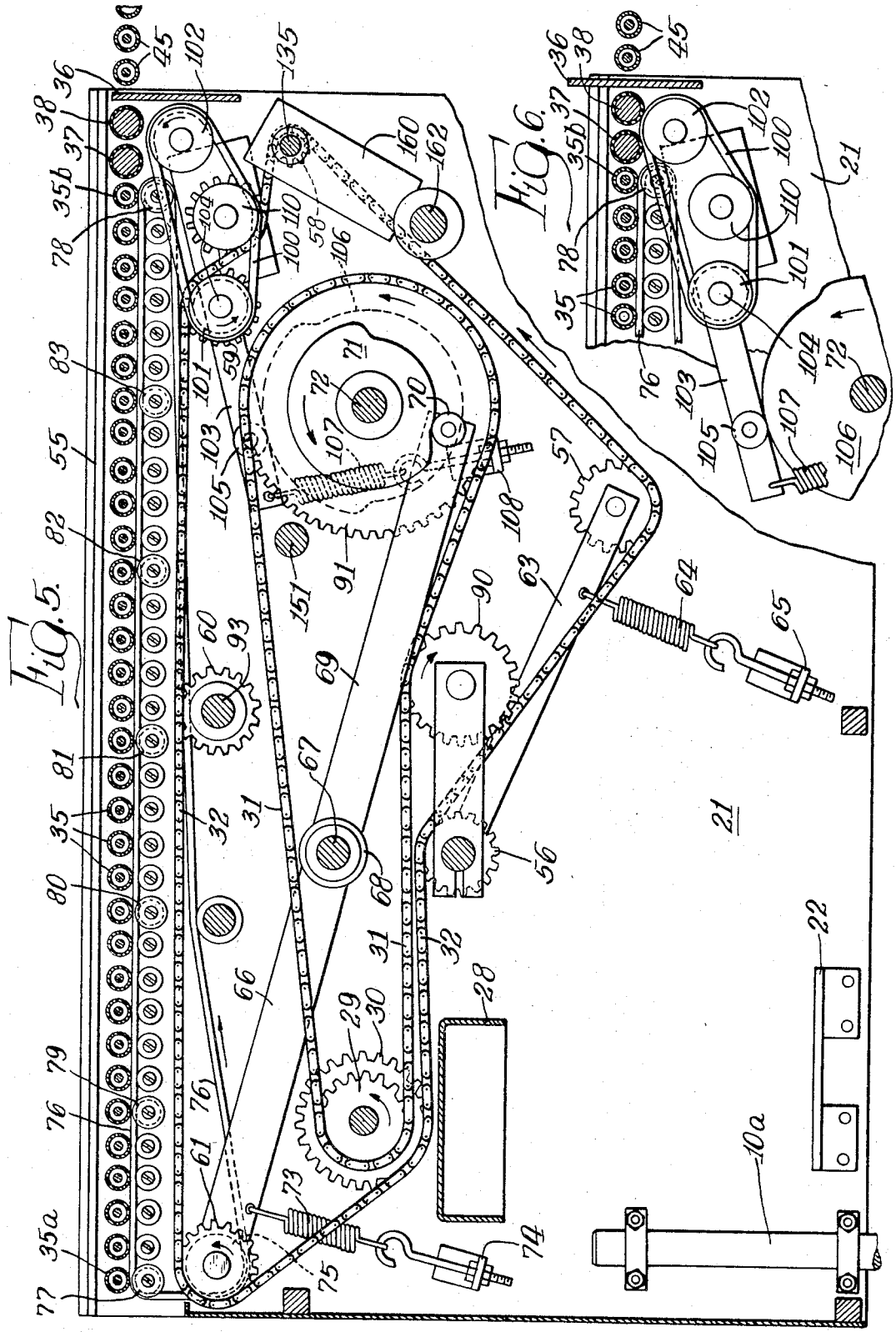

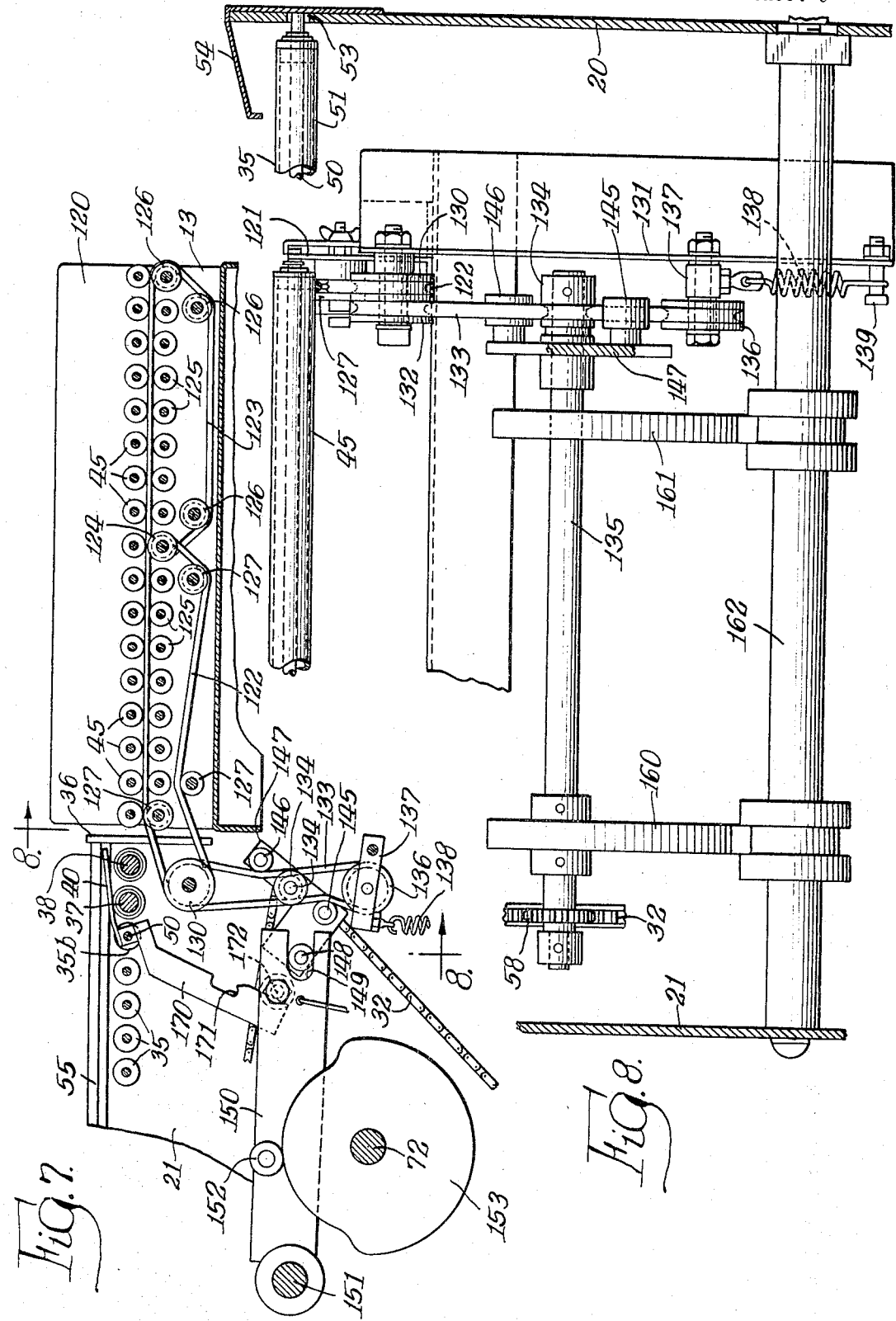

| | 0° | 120° | 240° | 360° |
|---|---|---|---|---|
| INFEED CONVEYOR LIVE ROLLERS 35 (CAM 71) | FEEDING | STOPPED | STOPPED | |
| PACKAGE STOP 36 (CAM 95) | UP | DOWN | UP | |
| TRANSFER CONVEYOR 37,38 (CAM 106) | FREE WHEEL | FEEDING | FREE WHEEL | |
| PLATFORM CONVEYOR 45 (CAM 153) | STOPPED (WEIGHING TIME) | FEEDING | STOPPED (WEIGHING TIME) | |

United States Patent Office 3,353,653
Patented Nov. 21, 1967

3,353,653
PACKAGE INDEXING DEVICE
Bengt A. Arvidson, Villa Park, and Ernest C. Clement, Oak Park, Ill., assignors to Corley-Miller, Inc., a corporation of Ohio
Filed Aug. 3, 1966, Ser. No. 570,070
15 Claims. (Cl. 198—39)

ABSTRACT OF THE DISCLOSURE

A package indexing device having a movable package stop in advance of a scale platform of a weighing scale with conveying mechanism provided to advance packages to the stop and across the stop during during a cycle of operation with conveying structure associated with the scale platform to convey a package onto the platform for weighing and to then remove the package from the platform.

---

This invention relates to package handling mechanism and, more particularly, to a package indexing device associated with a weighing scale and package labelling mechanism.

An object of this invention is to provide a new and improved package indexing device having simple, trouble-free mechanism including conveying mechanism on a scale platform which receives packages of various sizes and shapes as may be delivered in a random fashion thereto and sequentially delivers packages to the scale platform of a weighing scale for making weight.

Another object of the invention is to provide a package indexing device in which a lead-in conveyor intermittently carries successive packages to a package stop with a transfer conveyor operated intermittently to advance successive packages across the stop and a supporting package conveyor on the scale platform operated intermittently to receive and deliver a package to a central location relative to the scale platform in one cycle of operation and in the next cycle of operation to remove the package from the scale platform and deliver it to mechanism, such as a labeller, for applying a label to the package.

Still another object of the invention is to provide a package indexing device, as defined in the preceding paragraph, wherein the platform conveyor embodies a series of live rollers extending from front to rear of the scale platform and across the width thereof which are intermittenly driven by means of a drive which can be disconnected to stop the package for weighing and avoid any vibration on the scale platform.

A further object of the invention is to provide a package indexing device as defined in the preceding paragraph in which a package detector is positioned immediately in front of the package stop whereby when no package is present at the package stop the means for driving the platform conveyor are incapacitated whereby no operation thereof occurs to avoid imparting vibrations to the scale platform.

Further objects and advantages will become apparent from the following detailed description taken in connection with the accompanying drawings in which:

FIG. 1 is a front elevational view of the package indexing device, shown in association with a weighing scale and package labelling mechanism;

FIG. 2 is a plan view of the structure shown in FIG. 1, except for the label applying mechanism;

FIG. 3 is a vertical section, taken generally along the line 3—3 in FIG. 2;

FIG. 4 is a plan section, taken generally along the line 4—4 in FIG. 3;

FIG. 5 is a vertical section, taken generally along the line 5—5 in FIG. 4;

FIG. 6 is a fragmentary view of the structure shown at the upper right-hand corner of FIG. 5;

FIG. 7 is a vertical section on an enlarged scale, taken generally along the line 7—7 in FIG. 2;

FIG. 8 is a vertical section taken generally along the line 8—8 in FIG. 7;

FIG. 9 is a fragmentary vertical section, taken generally along the line 9—9 in FIG. 4; and FIG. 10 is a timing diagram of the operative mechanism of the package indexer.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

An over-all assembly of the structure is shown in FIG. 1 in which a portion of the package indexer has a frame, indicated generally at 10 with legs 10a, adjacent a table 11 mounting a scale 12 having a scale platform 13 disposed between the frame 10 and a package labelling mechanism, indicated generally at 14. The package labelling mechanism is disclosed in an application of Arvidson and Treiber, Ser. No. 451,742, filed Apr. 29, 1965, and reference may be had thereto for a more detailed understanding of the construction. For understanding herein, it only need be understood that a conveyor 15 of the label applying mechanism receives a package from the scale platform 13 and delivers it to a position wherein mechanism can receive a printed label and apply it to package. The label will be printed with the weight of the package and the price and, normally, also the price per pound, with this information being established by a computer 16 associated with the scale 12 and the label applying mechanism 14 which has the label printer as a part thereof.

The frame 10 has spaced-apart front and rear plates 20 and 21 which mount, therebetween, the prime mover for the package indexing mechanism, as well as a number of operating components including the lead-in conveyor and transfer conveyor for packages and the package stop. A plate 22 extended from the rear wall 21 mounts a motor 23 having an output shaft with a pulley 24 driving an upwardly extending belt 25 engaging an input pulley 26 for a gear reduction unit 27. The reduction unit 27 is mounted on a panel 28 extending across the mounting frame between plates 20 and 21. The gear reduction unit has an output shaft with a pair of coaxial drive sprockets 29 and 30 for driving a pair of chains 31 and 32, respectively (FIG. 5), for driving parts subsequently to be described.

The frame plates 20 and 21, adjacent their upper ends mount both a package lead-in conveyor and a transfer conveyor. As shown in FIG. 2, the lead-in conveyor embodies a series of live rollers 35 extending from front to rear of the frame 10, with the left-hand end roller being identified at 35a and the end roller at the other end identified at 35b. These rollers are intermittently driven by means to be described to advance a package to a package stop 36 positioned at the end of the frame 10 and immediately in advance of the scale platform 13.

A transfer conveyor is positioned immediately in front of the package stop 36 and embodies a pair of rubbersurfaced rollers 37 and 38, as shown in FIG. 2, which can free-wheel when a package is being advanced by the lead-in conveyor rollers 35 to permit advance of a package into engagement with the stop 36. When driven, the rollers 37 and 38 will move a package across the stop 36 when the stop has been lowered to a non-blocking position. Although the rollers have limited engagement with the underside of the package, this is sufficient to move a package because of their high friction surface.

A package detector 40 is located immediately in front of the package stop 36 for detecting the presence or absence of a package for a purpose more fully set forth hereinafter and when depressed can fit in centrally located recesses in the surface of rollers 37 and 38.

With the structure described, a package P can be placed against an adjustable package stop 41 on the lead-in conveyor rollers 35 and repeated intermittent operation of the rollers 35 will advance the package to a position against the package stop 36 as permitted by the free-wheeling rollers 37 and 38 of the transfer conveyor and with the package depressing the package detector plate 40. The timing of operation is such that when the package stop is up the lead-in conveyor 35 is operating and the transfer conveyor rollers 37 and 38 are free-wheeling, while when the package stop 36 is down, the lead-in conveyor rollers 35 are inactive and the transfer rollers 37 and 38 are power rotated. With this action, a succeeding package cannot be moved into the transfer area, while a package is being transferred across the package stop 36.

An important part of the package indexer is the means which conveys a package after it is moved across the package stop toward a weighing position and, in the next cycle, after weighing advances a package off the scale for a subsequent operation, such as label-applying to the package. As shown in FIG. 2, the scale platform 13 has a series of live rollers 45 extending from front to rear of the scale platform 13 and across the width thereof. These live rollers are driven at the same time as the transfer conveyor rollers 37 and 38 and for an interval of time to receive a package and support it and move it to a position located centrally of the scale. The drive of the live rollers 45 is then stopped for an interval to permit weighing of the package and, in the next cycle, the live rollers 45 are driven to remove the weighed package from the scale and to receive the succeeding package if one has moved across the package stop 36. As subsequently described, the live rollers 45 are only intermittently driven and no moving parts are operating while the scale is making weight to avoid any vibration of the scale during weighing. The live rollers 45 and mechanism associated therewith can be considered as part of the tare weight when balancing the scale.

The foregoing mechanism can now be described in more detail, with the infeed conveyor rollers 35 being shown particularly in FIGS. 4, 5, 8 and 9. Each of the rollers 35 embodies a central shaft 50 having a cylindrical outer member 51 mounted on the shaft 50 by bearings at each end, such as bearing 52, shown in FIG. 9. The ends of the shaft 50 define mounting pins fitted into openings in the frame plates 20 and 21, with the openings 53, as shown in FIG. 9, being vertically elongate to permit slight floating movement of the live rollers 35.

A pair of removable, general L-shaped cover plates 54 and 55 associated with the frame plates 20 and 21, respectively, engage the ends of shafts 50 to hold the rollers in their mounting slots in the frame plates, as shown in FIGS. 8 and 9. The drive for the rollers 35 is derived from the endless drive chain 32, previously referred to, which, as shown in FIG. 5, passes about sprocket 56, idler sprocket 57, sprocket 58, sprocket 59, sprocket 60, and adjustable sprocket 61.

The idler sprocket 57 is mounted on a pivoted arm 63 which, under the urging of a spring 64 connected to bracket 65 takes up slack in the chain 32. The sprocket 61 is carried on an arm 66 pivoted on a mounting shaft 67 extending between the frame plates 20 and 21 and connected by a sleeve 68 to an offset arm 69 carrying a cam follower roller 70 operatively engaged with a cam 71 fixed to a rotatable cam shaft 72. The arms 66 and 69 are urged pivotally about shaft 67 by a tension spring 73 connected to a bracket 74 on the rear frame plate 21. The sprocket 61 is drivingly connected to a coaxial drive pulley 75 (FIGS. 4 and 5) having an endless belt 76 extending therearound and, as shown in FIG. 5, passing about a pair of guide pulleys 77 and 78 underlying the end lead-in conveyor rollers 35a and 35b and extending beneath the ends of rollers 35 adjacent the rear frame plate 21. The belt 76 is supported intermediate its length by supporting rollers 79, 80, 81, 82, and 83, which are grooved to provide guiding flanges with additional rollers therebetween also providing for support of the belt 76. With the floating action of the rollers 35, the weight of a package will press the rollers against the belt to result in rotation of the rollers in a clockwise direction, as viewed in FIG. 5, as the upper stretch of the belt 76 travels from right to left, as viewed in the figure. The drive of belt 76 is intermittent, dependent upon the action of cam 71. When the cam follower 70 is on the low of the cam 71, the spring 73 is effective to lower the sprocket 61 and drive pulley 75 to tightly engage belt 76 and cause movement thereof, while when the follower 70 moves onto the high of the cam 71, the belt 76 is slacked so as to not be driven.

Reference has been made to the cam shaft 72. This shaft is driven by the chain 31, previously referred to, which passes about a take-up sprocket 90 and about a sprocket 91 fixed to the shaft 72, with the latter shaft being rotatably mounted between frame plates 20 and 21.

The package stop 36 and the mechanism for operating the stop are shown particularly in FIGS. 3 and 4 wherein an arm 92 is pivotally mounted on a shaft 93 extending between the frame plates 20 and 21 and has a cam follower roller 94 engageable with a cam 95 on the cam shaft 72. The forward end of the arm 92 has the upstanding package stop member in the form of a plate secured thereto. This plate, as shown in FIG. 3, is relatively thin and can extend upward between the transfer conveyor roller 38 and the first roller 45 of the platform conveyor. Approximately two-thirds of the cam 95 is a high surface whereby the package stop is in elevated, blocking position, while during approximately one-third of a cycle of the cam, follower roller 94 goes onto the low of the cam to permit lowering of the package stop 36 under its own weight to a level beneath the top of the transfer rollers.

The transfer conveyor rollers 37 and 38, which have a slightly higher effective surface than the lead-in conveyor rollers 35, are intermittently driven and at other times are free-wheeling, as previously mentioned. The intermittent drive of these two rollers is accomplished by means of mechanism shown in FIGS. 4, 5 and 6 and comprises a belt 100 passing about a pulley 101 coaxial with the sprocket 59 and driven thereby and about a pulley 102, with the pulley 102 rotatably mounted on an arm 103 pivoted by a pivot bearing 104 mounted to the rear frame plate 21 and which carries the sprocket 59 with a cam follower roller 105 on the arm engageable with a cam 106 fastened to the cam shaft 72. A spring 107 connected between an end of the arm 103 and a bracket 108 on the rear frame plate 21 urges the cam follower roller 105 into engagement with the cam 106. With the arm 103 pivoting about the bearing 104 when the follower 105 goes onto the low of the cam 106, as caused by the spring 107, the belt 100 is moved up into yieldable engagement with the surface of the rollers 37 and 38, as shown in FIG. 6 to impart clockwise rotation to these rollers. As shown in FIG. 10, approximately two-thirds of cam 106 is a high, so that the drive belt 100 is lowered to permit free wheeling of the transfer rollers 37 and 38, while during one-third of a cycle the transfer rollers are driven to feed a package across the package stop 36, which is at the time that the package stop 36 is in its down position.

The arm 103 carries an intermediate adjustable tension roller 110 for the belt 100, as shown in FIG. 6.

The platform conveyor for the scale platform and the drive mechanism therefor is shown particularly in FIGS. 3, 7, and 8. The live rollers 45 of the platform conveyor are mounted between a rear plate 120 of the scale platform 13 and a front plate 121 interconnected beneath the live rollers, with the rollers being mounted in elongated slots in the plates 120 and 121 and being of the same construction as the lead-in conveyor rollers 35, previously described in detail and also shown in FIG. 8. Means for intermittently driving the platform conveyor rollers comprise belt means in the form of a pair of belts 122 and 123 each passing about a centrally positioned double-grooved pulley 124 and extending over support rollers 125 whereby the upper reaches of the belts lie immediately beneath the forward ends of the rollers 45. The belt 123 is additionally guided by guide pulleys 126 and the belt 122 by guide pulleys 127. The drive belt 122 extends to a position to wrap about a pulley 130 mounted on a plate 131 extending downwardly from the front plate 121 of the scale platform. The double pulley 130 has a groove 132 about which a belt 133 hangs and extends to either side of a driven wheel 134 fixed to a rotatable shaft 135 which mounts the sprocket 58 driven by the chain 32. The belt 133 is maintained under tension by passing about a lower pulley 136 mounted on a pivoted arm 137 urged downwardly by a spring 138 connected at its lower end by a pin 139 to the plate 131 supported from the scale platform.

With the parts shown as positioned in FIGS. 3 and 4, the belt 133 does not engage the driven wheel 134 whereby there is no connection whatsoever to the platform conveyor mechanism, so that the scale platform is free for movement and can make weight of a package which is stationarily supported on the scale platform and with there being no vibration transmitted to the scale. In order to connect the drive to the platform conveyor rollers 45 by driving the belts 122 and 123, the belt 133 is brought into engagement with the driven wheel 134. This is accomplished by swinging a pair of rollers 145 and 146 to a position to engage the belt 133 and actually move opposite reaches of the belt toward each other into engagement with the groove of the driven wheel 134, as shown in FIGS. 7 and 8, whereby the rotation of the wheel 134 is imparted to the belt 133. The rollers 145 and 146 are mounted on a plate 147 pivotal on the shaft 135 and having a pin 148 engageable in a slot 149 of an arm 150 pivotally mounted on a shaft 151 extending between frame plates 20 and 21, with the arm carrying a cam follower roller 152 engageable with a cam 153 on the shaft 72. The cam follower 152 is caused to follow the cam 153 by means of a tension spring 154 connected between the arm 150 and a bracket 155 fastened to the lower part of the frame 10, as shown in FIG. 3.

As shown in FIG. 10, the cam 153 has a high operative through approximately two-thirds of a cycle to keep the arm 150 elevated to thereby not drive the platform conveyor, while approximately during one-third of the cycle the platform conveyor is driven at the same time as the transfer conveyor rollers 37 and 38.

The shaft 135 is supported by a pair of brackets 160 and 161, as shown in FIG. 8, having bearings for receiving the shaft 135 and having their lower ends connected to a shaft 162 extending between the frame plates 20 and 21.

When the package indexer is not delivering packages, it is desirable not to operate the platform conveyor rollers 45 and this is accomplished by the package detector located immediately in front of the package stop 36 and having the plate 40 engageable by a package for depression thereof from the position shown in the drawings. The plate 40 pivots about the shaft 50 of the roller 35b, which has the central section thereof removed and has a depending arm 170 with a notch 171 engageable with a pin 172 extending from the arm 150, as shown in FIG. 4. When a package is present in front of the stop, the plate 40 is depressed into recesses in transfer conveyor rollers 37 and 38, with the result that the notch 171 in the arm 170 is moved out of position to receive the pin 172 on arm 150, whereby the arm 150 can go through its normal cycle. If a package should not be present, as the arm 150 is elevated, the pin 172 will fall into the notch 171 so as to hold the arm 150 elevated, with the result that the platform conveyor rollers 45 are not driven until such time as a package depresses the detector plate 40 to free the arm 150 for operation under control of its cam 153. A package may be on the platform conveyor when the detector operates to stop the conveyor and this package can be removed manually.

As shown in FIG. 4, a pair of micro-switches 190 and 191 are provided under the control of cams 192 and 193 on the cam shaft 72 to tie in the package indexing with the scale whereby the scale will not operate until the platform conveyor rollers 45 have stopped and will not start unless the scale has made weight.

In operation of the mechanism disclosed herein, a package is placed on the infeed conveyor rollers 35 against the locating member 41, with the latter member being adjustable relative to the center line of travel of the package by mechanism, not shown. The infeed conveyor rollers 35 are driven for the first 120° of the cycle, as shown in FIG. 10. When a package reaches the package stop 36 after one or more cycles, which is in up position during this interval, it will be blocked and can move into engagement with the stop as moved by the rollers 35, since the transfer rollers 37 and 38 are in free-wheeling condition. At the end of 120° of cycle, the infeed conveyor rollers 35 stop, the package stop 36 lowers to permit travel of the package across the stop, and the drive to the transfer conveyor rollers 37 and 38 starts to move a package across the stop. Because the infeed conveyor rollers 35 are not operating at this time, a succeeding package will not be advanced toward the package stop. At the same time that the transfer conveyor rollers 37 and 38 are operating, the platform conveyor live rollers 45 are also operating to receive a package delivered across the package stop and deliver the package to approximately the center of the scale platform while still supporting the package. This occurs up to 240° of cycle and then the transfer conveyor and platform conveyor are stopped and the package stop 36 is moved up, with the infeed conveyor still not operating. At the beginning of the next cycle, the operation is repeated. During the next cycle, the package that has been weighed on the scale platform is moved off to the labelling mechanism when the platform conveyor again starts operating.

With the foregoing operation, packages coming at random or following each other closely, of various sizes and shapes, will be separated and delivered, one at a time, in timed sequence to the scale and then into a labelling machine for affixing the label which was computed, printed, and delivered after the scale had weighed the package. The use of the live rollers in conveying a package to and across and from the scale avoids the requirement for devices such as cycloidal pushers and, thus, it is possible to have greater flexibility in the timing of delivery as well as the rate and distance of travel at the various points of operation of the mechanism. Maximum time is made available for making weight on the scale and less time is needed for moving the package. This results in greater production, since the speed with which some scales make weight is limited.

The platform conveyor mechanism is extremely simple and, as constructed and operated, does not affect the accurate weighing of the package. As stated previously, the mechanism on the scale platform can be part of the tare setting of the scale and the drive connection between the conveyor and the prime source is completely broken, so that movement of the scale platform during weighing is not influenced by any mechanism other than that directly on the scale platform. This avoids any mechanical or electrical connections to the scale platform during weighing.

We claim:

1. A package indexer for advancing packages to be weighed and subsequently marked with a weight and package price wherein the packages can be received at random and of various sizes and shapes comprising, a weighing scale having a platform, a package stop in advance of said platform, means for cyclically moving said package stop between blocking and non-blocking positions, intermittently operable first means for advancing packages successively to said package stop, when the package stop is in blocking position, intermittently operable second means both in advance of and beyond the package stop and operable when the first means is not operable to move a package across the stop when the package stop is in non-blocking position and onto the scale platform including a power driven conveyor with conveying elements overlying substantially the entire scale platform at all times.

2. A package indexer as defined in claim 1 having a drive for said power driven conveyor, and means for stopping said drive to stop a package on the platform and free said platform from vibration during package weighing.

3. A package indexer as defined in claim 1 having a drive train from a drive source off the platform for said power driven conveyor, and means for disconnecting said drive train to stop a package on the platform and free said platform for movement during package weighing.

4. A package indexer as defined in claim 1 wherein said power driven conveyor comprises rollers extending from front to rear on the platform and positioned across the entire width of the platform to also convey a package off the platform after it has been weighed.

5. A package indexer as defined in claim 4 having a first belt extending lengthwise of the scale platform and positioned to engage the underside of the rollers, and means for driving said first belt including a second belt depending from said platform and rotatable means engageable with the second belt for driving the second and first belts and disengageable from the second belt to stop the drive and permit free movement of the platform during weighing of a package.

6. A package indexer for advancing successive packages onto a weighing scale and then off the scale comprising, a frame, a package stop mounted on said frame and in advance of a platform of the weighing scale, means for cyclically moving said package stop between blocking and non-blocking positions, a lead-in conveyor on said frame for receiving packages and delivering them successively to said package stop when the package stop is in the blocking position, a transfer conveyor on said frame in advance of the package stop having a free-wheeling condition to permit movement of a package thereon to the package stop without driving a package held against the stop and a driven condition for transferring a package across the stop when the package stop is in non-blocking position while the lead-in conveyor is inoperative to advance further packages, a power driven conveyor defining a package support by elements overlying substantially the entire scale platform at all times and extending to a position adjacent the stop to receive a package conveyed across the stop and deliver it to a central location on the platform conveyor in one cycle and subsequently in the next cycle deliver the package off the platform, and means for driving the transfer conveyor and platform conveyor at the same time to advance a package to said central location.

7. A package indexer as defined in claim 6 including a package detector immediately in front of said package stop, and means associated with the detector to disconnect the drive to the platform conveyor and avoid platform vibration when there is no package to be delivered to the platform.

8. A package indexer as defined in claim 6 wherein said means for driving the platform conveyor includes a driven wheel on said frame, a belt supported by the scale platform and adjacent said wheel but not in contact therewith and operatively connected to said platform conveyor, and means on said frame for bringing said belt and wheel into engagement to cause the wheel to drive the platform conveyor while otherwise there is no contact and the scale platform is free to move relative to the frame.

9. A package indexer for facilitating weighing and labelling of successive packages which can be of various sizes and shapes and received in random fashion comprising, a frame, a weighing scale with a scale platform adjacent said frame, a package stop on said frame immediately in front of said scale platform, means on said frame for cyclically moving said package stop between blocking and non-blocking positions, a lead-in conveyor on said frame for advancing successive packages to said package stop, means on said frame for driving said lead-in conveyor when the package stop is in blocking position, a relatively narrow transfer conveyor immediately in front of said package stop and having a free-wheeling condition to permit movement of a package by the lead-in conveyor to the package stop, means on the frame for intermittently driving the transfer conveyor when the package stop is in non-blocking position to transfer a package across the stop, a package supporting conveyor on the scale platform to receive a package delivered by the transfer conveyor, and means for intermittently driving the platform conveyor to locate a package centrally for weighing in one cycle and in the next cycle advance the weighed package off the platform to a position for package labelling.

10. A package indexer as defined in claim 9 in which said lead-in conveyor, said transfer conveyor and the platform conveyor are all defined by rollers and are caused to operate by imparting rotation thereto.

11. A package indexer as defined in claim 10 in which the rollers of the lead-in conveyor and the platform conveyor are free floating for up and down movement, a driven belt underlying each set of rollers, and means for intermittently driving said driven belts.

12. A package indexer as defined in claim 9 wherein the platform conveyor comprises a series of rollers extending from front to rear of the platform and for the width thereof, and said intermittent drive means includes a belt operatively connected to said rollers and supported by the platform, a rotatable wheel on said frame adjacent said belt, and means for bringing said wheel and belt into engagement when the platform conveyor is to be driven but otherwise rendering the scale platform free for up and down movement during package weighing.

13. A package indexer as defined in claim 12 wherein a package detector is positioned in front of the package stop, and means operated by the detector when no package is present to block said means for bringing the belt and wheel into engagement whereby the platform conveyor does not operate and unnecessary vibration of the scale platform is avoided.

14. A package indexer as defined in claim 9 wherein the platform conveyor comprises a series of rollers extending from front to rear of the platform and for the width thereof, and said platform conveyor driving means includes belt means extending across the width of the platform beneath said rollers in position to be engaged by said rollers, and means for imparting linear movement to the belt means to cause rotation of the rollers.

15. A package indexer as defined in claim 14 in which said belt means passes about a drive pulley on the platform and the means for imparting linear movement to the belt means includes a drive belt passing about the drive pulley and freely hanging to a position adjacent a driving wheel on the frame, and means on the frame for moving the drive belt into engagement with the driving wheel, said last mentioned means including a cam-operated lever, and a package operated link to hold the lever against movement when no package is present at the package stop.

References Cited

UNITED STATES PATENTS 3,155,222   11/1964   Stremke _____ 198—34

RICHARD E. AEGERTER, *Primary Examiner.*